Aug. 19, 1924.
L. F. STAFFORD
1,505,169
BUMPER
Filed Oct. 12, 1923
2 Sheets-Sheet 2
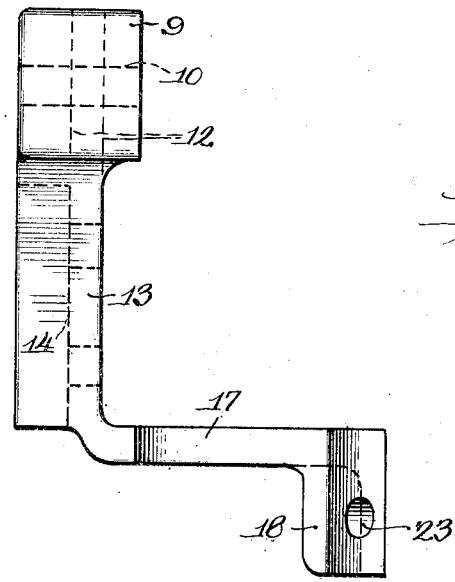
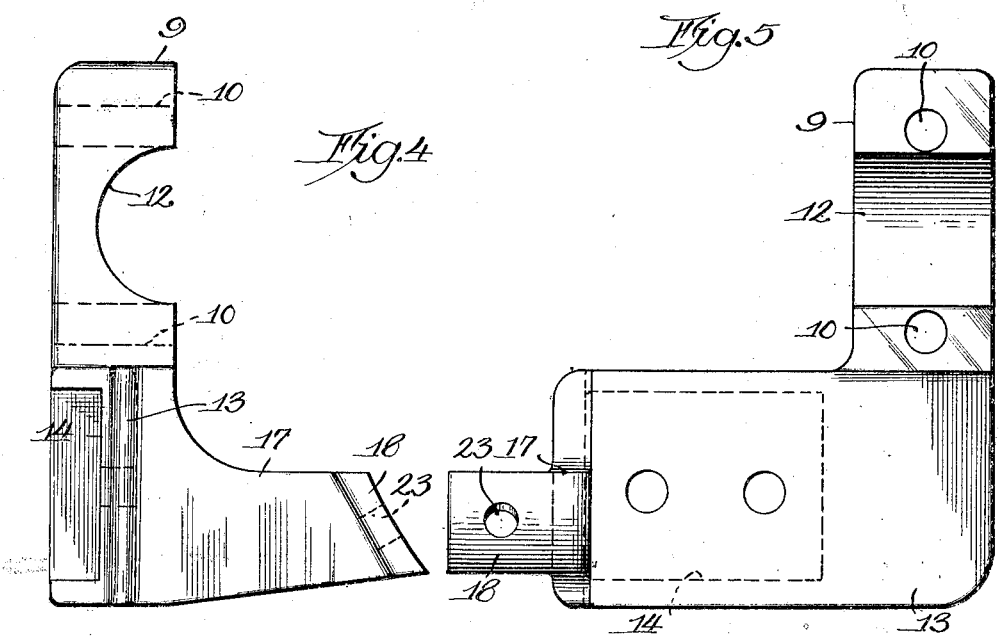

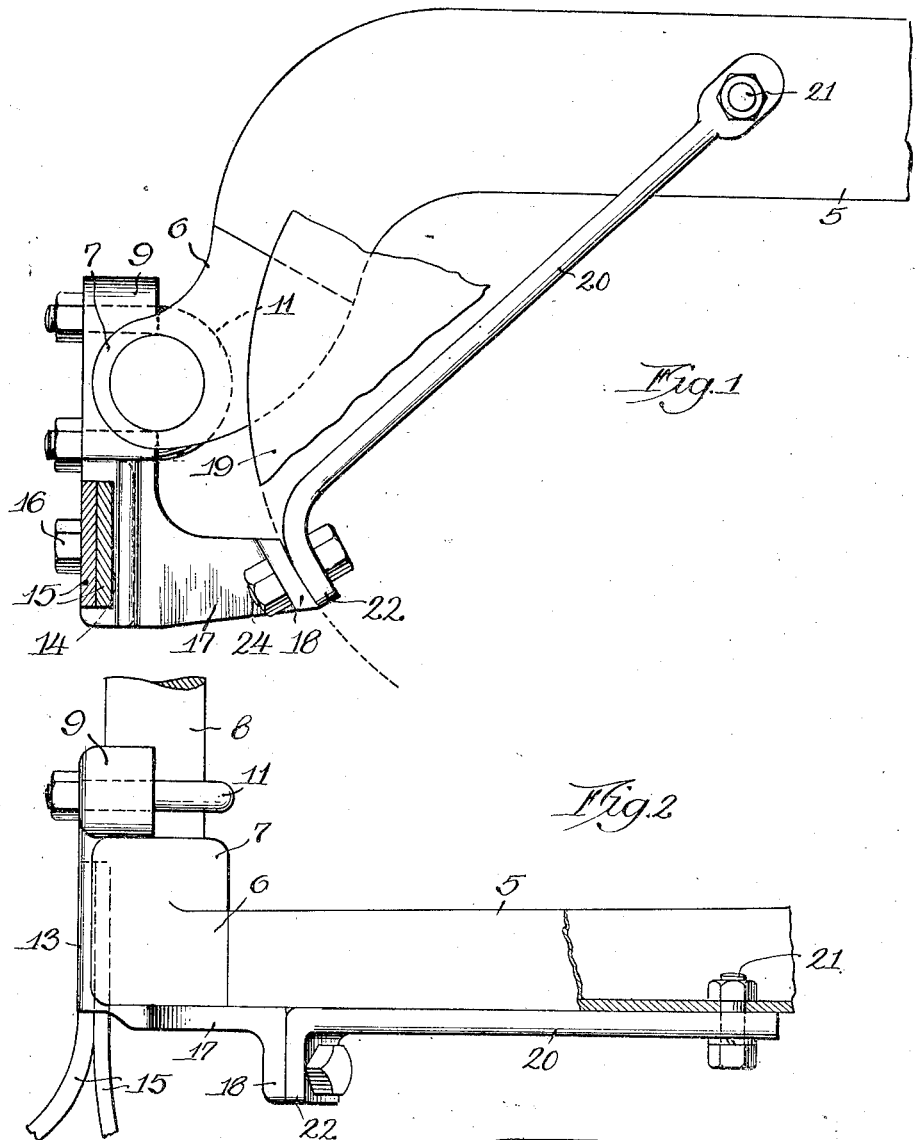

Patented Aug. 19, 1924.

1,505,169

UNITED STATES PATENT OFFICE.

LEWIS F. STAFFORD, OF CHICAGO, ILLINOIS, ASSIGNOR TO STAFFORD SALES COMPANY, OF CHICAGO, ILLINOIS, A CORPORATION OF ILLINOIS.

BUMPER.

Application filed October 12, 1923. Serial No. 668,110.

*To all whom it may concern:*

Be it known that I, LEWIS F. STAFFORD, a citizen of the United States, and a resident of Chicago, in the county of Cook and State of Illinois, have invented certain new and useful Improvements in a Bumper, of which the following is a full, clear, and exact description, such as will enable others skilled in the art to which it appertains to make and use the same.

My present invention relates generally to automobile bumpers or fenders that are used to protect the front and rear of the vehicle from impacts such as are received in collisions, and it has more specific application to a special bracket to be used for supporting the bumper from the vehicle and attaching an inwardly extending portion of the bumper to the frame of the chassis.

The structure which I have herein disclosed is particularly applicable to the chassis of the well-known type of Buick automobile, although it will be understood that the respective elements of the bracket may be readily utilized for the chassis of other makes of vehicles with but slight alteration.

In carrying out my invention I prefer to employ a casting that is suitably shaped so that it may be clamped to the cross-bar that connects the extended ends of the chassis side-sills (usually designated as the "horns"), and said casting is provided with a downwardly projecting extension of suitable shape to receive the adjacent ends of the bumper arms. For the purpose of reinforcing and bracing this bracket I provide a link or brace bar that extends from the underside of the casting, or from a lug projecting therefrom, obliquely upwardly for attachment to the side-sill of the chassis frame at a point removed from the location of the bracket. This brace-bar may be made in different lengths or the aperture for the insertion of the clamping bolt may be located at divers points on the sill so as to adjust the relative horizontal position of the bumper body to take care of discrepencies in the construction of the chassis and it also maintains the bumper body against excessive vertical vibration to which the structure may be subjected when the vehicle is moving over a rough road-bed.

The divers objects of my invention therefore reside in providing a bracket for attaching the bumper to the vehicle that is both simple in construction and comparatively inexpensive to manufacture so that it will not materially increase the retail price of the bumper; that is easy to install upon the motor-vehicle by persons unfamiliar with mechanical work; and which is dependable and effective in performing the functions for which it has been designed and is novel in construction.

I prefer to carry out my invention and accomplish the foregoing and other objects through the instrumentalities which will be hereinafter disclosed and which are more particularly pointed out in the claims, in connection with which reference will be made to the accompanying drawings that form a part of this specification.

In the drawings:

Figure 1 is a side elevation of the end portion of a motor-vehicle chassis showing my bumper attaching bracket assembled therewith.

Fig. 2 is a top plan of the structure shown in Figure 1.

Fig. 3 is a top plan of the bracket detached from the vehicle and drawn to an enlarged scale.

Fig. 4 is a side view of the bracket looking at the same from the end nearest the vehicle.

Fig. 5 is an elevation of the bracket looking at the same from the side nearest the vehicle.

Fig. 6 is a small view similar to Fig. 1 showing a modified brace-rod.

The accompanying drawings illustrate a typical or preferred embodiment of my bumper attaching bracket, and in said drawings I have designated similar parts by the same reference characters wherever the said parts appear throughout the several views.

The chassis of the Buick motor-car includes the longitudinally disposed side-sill 5 which is formed of channel-metal of U-shape in cross-section and is disposed with the web thereof in a vertical plane upon the outer side of the frame. One of the ends of this side-sill extends or projects beyond the end-sill (not shown) and is curved downwardly in the manner shown to provide what is usually known as the chassis "horn" to which the adjacent ends of the springs are connected through an end casting 6 that is elongated to be inserted between the lateral horizontal flanges of the side-sill and is riveted or otherwise rigidly secured thereto. The outer end of this end casting is provided with a cylindrical-shaped boss 7 with its axis horizontal and is bored axially for the insertion of the cross-bar 8 that connects the adjacent ends of the right and left side-sill of the chassis frame. The above-described elements form a part of the standard construction of the make of automobile above-mentioned and possibly others, and therefore form no portion of my present invention but are employed to illustrate a typical construction upon which my bracket or mounting device may be installed.

As will be seen in the drawings my bracket preferably comprises an irregularly shaped casting having an extension upon one side in the form of a substantially rectangular shaped block 9 that is provided with a plurality of transversely disposed horizontal apertures 10 through which the parallel members of U-shaped clips 11 are inserted with their connecting portions over the tie-rod 8 so as to clamp the latter into a concave recess or channel 12 that is formed upon one of the vertical faces of the block.

As seen in Figure 5, the block 9 forms an extension at one end of a flat plate 13 of rectangular shape and is disposed upright upon the upper edge thereof at substantially a right-angle thereto. The plate 13 just alluded to is provided upon its outer face with a channel shaped recess 14 to provide a seat to receive the adjacent ends of the side-by-side bumper arms 15 as seen in Fig. 1 that are suitably secured thereon by means of bolts 16, rivets, or in any other suitable manner. Extending substantially horizontally from the end of the plate 13 opposite the block 9 is a horizontal arm 17 which, at its outer end, is provided with a lateral member or lug 18 that is apertured to receive a clamping bolt or the like for maintaining the brace-rod in position as will hereinafter more fully appear. As seen in Figures 1 and 4 of the drawings the face of this lug 19 is preferably inclined or oblique to a vertical plane and is made slightly concave so that it will fit snugly against the outer surface of a splash pan 19 at the rear end of the chassis of the Buick automobile and which extends between the horns of the chassis.

In order to re-inforce and insure rigidity of the bracket after the same has been assembled with the cross-bar 8 of the vehicle chassis I provide a brace-rod 20 that is secured at its upper end to the side sill 5 of the chassis by means of a bolt and nut device 21, the shank of the bolt passing through an aperture usually found in the web of the chassis side-sill. The lower end of the brace-rod 20 is bent laterally as at 22 so as to lie approximately parallel with the oblique face of the lateral lug 18 of the bracket. In assembling the structure after the bracket has been positioned with the bumper arms thereon in approximately the location shown in Figure 1, the splash-pan 19 is drilled through at the location of an aperture 23 in the lateral lug 18 and the lower transverse end 22 of the brace-rod 20 is brought into registry with the lug 18 and the bolt 24 is passed through the registering aperture, and the entire structure is clamped into position. It will be seen the brace-rod 20, by its connection with the arm 17 of the bracket, re-inforces the bracket securing means and prevents vertical vibration or accidental rotative movement upon the cross-bar 8 of the chassis.

The structure which I have herein illustrated and described, while primarily adapted for use upon the rear forks or horns of the chassis, may, without material modification, be used at the front end of the vehicle.

If desired, the brace rod may be made in the form shown in Figure 6 wherein the bar 25 has its upper end 26 bent obliquely to its straight portion and the same is secured to the chassis side-sill 5 by means of a J-bolt 27 that extends under the lower flange of the sill 5, and its hooked end engaged with the opposite edge of said flange. This, in some incidents, may be found to be a more convenient manner of assembling, but does not alter the principle of my invention. It will also be appreciated that other modifications may be made without materially departing from the principles of my invention, and I therefore desire it understood that all such changes are fully contemplated as coming within the scope of the appended claims.

What I claim is:

1. A bumper attaching bracket comprising a rectangular plate having a channeled face to receive a portion of a bumper, a vertical block extending above said plate and having a horizontal recess in its upper portion, and means extending through said block whereby the bracket is secured pendently to a suitable portion of a vehicle.

2. A bumper attaching bracket comprising a rectangular plate having a channeled face to receive a portion of a bumper, a vertical block extended above said plate and having a horizontal recess in its upper portion, means extending through said block and engaging a portion of a vehicle, whereby the bracket is pendently mounted and a brace arm extended upwardly from the lower portion of said structure toward the vehicle.

3. A bumper attaching bracket comprising a rectangular plate adapted to receive a portion of a bumper, a vertical block projecting above said plate and having a horizontal recess for engagement with a transverse member of a vehicle, an arm extended laterally from said plate, and a brace-bar connected at its ends respectively to said arm and an adjacent portion of the vehicle.

4. A bumper attaching bracket comprising a rectangular plate adapted to receive a portion of a bumper, a vertical block projecting above said plate and having a horizontal recess for engagement with a transverse member of a vehicle, an arm extended laterally from said plate, and a brace-bar connected at its ends respectively to the transverse end of said arm and an adjacent portion of the vehicle.

5. The combination with a vehicle chassis having side-sills and a cross-bar connecting the ends thereof, of a bumper attaching bracket a portion thereof being formed to engage said cross-bar and be secured thereto, said bracket having a flat portion to which an element of a bumper is secured and provided with an arm extended longitudinally of a side-sill, and an inclined brace connecting said arm to said side-sill at a point removed from the cross-bar.

6. The combination with a vehicle chassis having side-sills and a cross-bar connecting the ends thereof, of a bumper attaching bracket a vertical face thereof being provided with a horizontal recess to engage said cross-bar, said bracket having a flat portion to which an element of a bumper is secured, an arm extended laterally from the flat portion of the bracket and disposed longitudinally of a side-sill, and means connecting said arm to said side-sill whereby said bracket is braced against rotative movement with respect to said cross-bar.

7. The combination with a vehicle chassis having side-sills and a cross-bar connecting the ends thereof, of a bumper attaching bracket consisting of a plate a vertical face thereof being channeled to receive an element of a bumper, a block extended from the upper edge of said plate and having a horizontal recess to engage said cross-bar, clips surrounding said cross-bar and secured to said block, an L-shaped arm projecting horizontally from said plate, and means connecting said arm to a portion of a side-sill.

8. The combination with a vehicle chassis having side-sills and a cross-bar connecting the ends thereof, of a bumper attaching bracket consisting of a plate a vertical face thereof being channeled to receive an element of a bumper, a block extended from the upper edge of said plate and having a horizontal recess to engage said cross-bar, clips surrounding said cross-bar and secured to said block, an L-shaped arm projecting horizontally from said plate, and a brace-bar having a laterally disposed end connected to the transverse portion of said arm and the opposite end thereof secured to the adjacent side-sill at a point removed from the cross-bar whereby said bracket is maintained against rotative movement with respect to the cross-bar.

Signed at Chicago, county of Cook, and State of Illinois, this 22nd day of September, 1923.

LEWIS F. STAFFORD.